(12) United States Patent
Rodriguez et al.

(10) Patent No.: US 9,600,754 B2
(45) Date of Patent: Mar. 21, 2017

(54) MACHINE-READABLE GLASS

(71) Applicant: Digimarc Corporation, Beaverton, OR (US)

(72) Inventors: Tony F. Rodriguez, Portland, OR (US); Kristyn R. Falkenstern, Portland, OR (US); Alastair M. Reed, Lake Oswego, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

(21) Appl. No.: 14/971,930

(22) Filed: Dec. 16, 2015

(65) Prior Publication Data

US 2016/0180207 A1 Jun. 23, 2016

Related U.S. Application Data

(60) Provisional application No. 62/096,415, filed on Dec. 23, 2014, provisional application No. 62/142,399, filed on Apr. 2, 2015.

(51) Int. Cl.
*G06K 19/06* (2006.01)
*G06K 7/10* (2006.01)

(52) U.S. Cl.
CPC ..... *G06K 19/06037* (2013.01); *G06K 7/1095* (2013.01)

(58) Field of Classification Search
CPC ....... G06K 19/06037; G06K 19/06009; G06K 19/06112; G06K 19/0614; G06K 7/12
USPC .................. 235/494, 462.05, 468
See application file for complete search history.

(56) References Cited

U.S. PATENT DOCUMENTS

| 3,628,271 | A | * | 12/1971 | Carrell | ...... | B44F 1/10 |
|---|---|---|---|---|---|---|
| | | | | | | 283/92 |
| 5,206,490 | A | * | 4/1993 | Petigrew | ...... | G06K 1/121 |
| | | | | | | 235/454 |
| 6,168,081 | B1 | * | 1/2001 | Urano | ...... | G06K 7/14 |
| | | | | | | 235/462.05 |

(Continued)

OTHER PUBLICATIONS

Kiyoto et al, Development of a Near-Infrared Reflective Film Using Disk-Shaped Nanoparticles, Fujifilm Research and Development Report No. 58-2013, 2013.

*Primary Examiner* — Paultep Savusdiphol
(74) *Attorney, Agent, or Firm* — Digimarc Corporation

(57) ABSTRACT

In one embodiment, a sidewalk-facing display window of a retail store is treated to scatter (or absorb) a portion of incident light, in a narrow wavelength spectral band. A machine-readable pattern, which encodes an identifier, is projected onto the treated window from outside the store. The reflection (absorption) of that projected pattern, within the narrow spectral band, escapes notice of shoppers on the sidewalk. Yet if a shopper captures imagery of a product displayed on the other side of the display window, using a mobile device camera, the pattern is captured with the imagery, and can be analyzed to decode the identifier. The mobile device can use this decoded identifier to access online information about the displayed product, for presentation to the shopper on the mobile device display. The technology is particularly suited for wearable computing devices, and more generally enables glass windows to subliminally convey digital information to image sensors conveyed by passing shoppers. A great variety of other features and arrangements are also detailed.

20 Claims, 4 Drawing Sheets

(56) References Cited

U.S. PATENT DOCUMENTS

| | | | |
|---|---|---|---|
| 6,177,683 B1* | 1/2001 | Kolesar | G06K 7/10722 235/468 |
| 6,246,778 B1* | 6/2001 | Moore | G07B 17/00435 340/5.1 |
| 6,456,729 B1* | 9/2002 | Moore | G07B 17/00435 235/491 |
| 6,947,571 B1 | 9/2005 | Rhoads et al. | |
| 6,961,442 B2 | 11/2005 | Hannigan | |
| 7,738,673 B2 | 6/2010 | Reed | |
| 7,757,952 B2* | 7/2010 | Tuschel | G06K 19/06037 235/375 |
| 8,360,323 B2* | 1/2013 | Widzinski, Jr. | G09F 3/0294 235/487 |
| 8,412,577 B2 | 4/2013 | Rodriguez | |
| 8,620,021 B2* | 12/2013 | Knudson | G06Q 30/00 382/100 |
| 9,064,228 B2* | 6/2015 | Woerz | G06Q 10/087 |
| 2003/0012548 A1 | 1/2003 | Levy et al. | |
| 2004/0023397 A1* | 2/2004 | Vig | G06K 1/121 436/1 |
| 2004/0046032 A1* | 3/2004 | Urano | G06K 7/14 235/468 |
| 2005/0127176 A1* | 6/2005 | Dickinson | G06K 17/00 235/385 |
| 2007/0152032 A1* | 7/2007 | Tuschel | G06K 19/10 235/375 |
| 2007/0152056 A1* | 7/2007 | Tuschel | G06K 19/06037 235/454 |
| 2007/0210164 A1* | 9/2007 | Conlon | G06Q 10/08 235/462.01 |
| 2007/0221732 A1* | 9/2007 | Tuschel | G06K 19/06037 235/462.01 |
| 2009/0266877 A1* | 10/2009 | Vonwiller | C09B 47/0676 235/375 |
| 2010/0025476 A1* | 2/2010 | Widzinski, Jr. | G09F 3/0294 235/488 |
| 2010/0048242 A1 | 2/2010 | Rhoads et al. | |
| 2010/0062194 A1* | 3/2010 | Sun | B42D 25/00 428/29 |
| 2010/0317399 A1 | 12/2010 | Rodriguez | |
| 2011/0111210 A1 | 5/2011 | Matsunami et al. | |
| 2012/0205435 A1* | 8/2012 | Woerz | G06Q 10/087 235/375 |
| 2012/0214515 A1 | 8/2012 | Davis et al. | |
| 2012/0311623 A1* | 12/2012 | Davis | H04N 5/765 725/18 |
| 2013/0223673 A1 | 8/2013 | Davis et al. | |
| 2013/0259297 A1* | 10/2013 | Knudson | G06F 17/30244 382/103 |
| 2013/0260727 A1* | 10/2013 | Knudson | G06Q 30/00 455/414.1 |
| 2014/0084069 A1* | 3/2014 | Mizukoshi | G06K 7/12 235/468 |
| 2014/0339296 A1* | 11/2014 | McAdams | G06F 17/30879 235/375 |
| 2015/0286873 A1 | 10/2015 | Davis et al. | |

* cited by examiner

MACHINE-READABLE GLASS

RELATED APPLICATION DATA

This application claims priority to provisional applications 62/096,415, filed Dec. 23, 2014, and 62/142,399, filed Apr. 2, 2015, the disclosures of which are incorporated by reference.

TECHNICAL FIELD

The present disclosure concerns, e.g., technologies enabling shoppers to interact with store window displays.

INTRODUCTION

In one embodiment, a sidewalk-facing display window of a retail store is treated to scatter (or absorb) a portion of incident light, in a narrow wavelength spectral band. A machine-readable pattern, which encodes an identifier, is projected onto the treated window. The reflection (absorption) of that projected pattern, within the narrow spectral band, escapes notice of shoppers on the sidewalk. Yet if a shopper captures imagery of a product displayed on the other side of the display window, using a mobile device camera, the pattern is captured with the imagery, and can be analyzed to decode the identifier. The mobile device can use this decoded identifier to access online information about the displayed product, for presentation to the shopper on the mobile device display. The technology is particularly suited for wearable computing devices, and more generally enables glass windows to subliminally convey digital information to image sensors conveyed by passing shoppers.

The foregoing and additional features and advantages of the present technology will be more readily apparent from the following detailed description, which proceeds with reference to the accompanying drawings.

DETAILED DESCRIPTION

Figure 1:
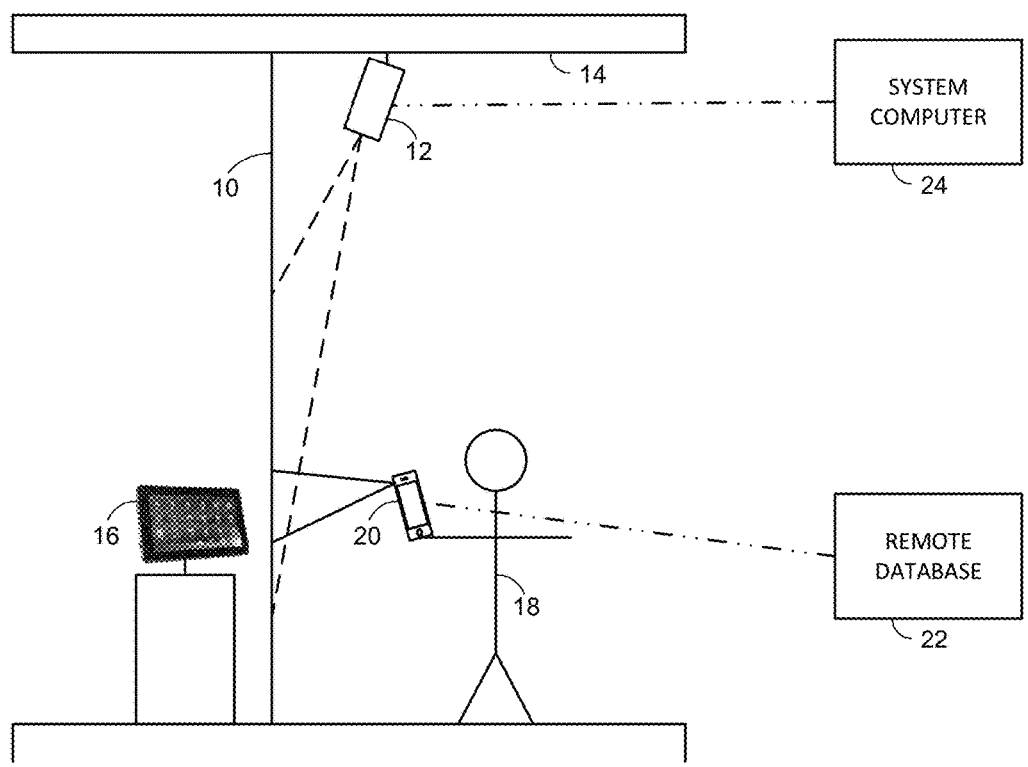
FIG. 1 illustrates aspects of one embodiment of the present technology.

Referring to FIG. 1, one implementation of the present technology includes a store display window 10, and an electronic data projector 12. The window includes an optical filter (not particularly shown) that notches a band of visible light spectrum (i.e., in the range of 400-700 nm). The projector 12 is mounted to a ceiling or building overhang 14, and projects an optical pattern downwardly on the window 10. A product 16 may be positioned on one side of the window, visible to shoppers 18 from the opposite side of the window. If a shopper 18 uses a camera-equipped device 20 to capture an image of product 16, the captured imagery also includes the optical pattern projected onto the intervening window, and reflected (scattered) by the optical filter.

The optical pattern desirably encodes an identifier in a machine-readable symbology, such as a linear barcode, a 2D barcode (e.g., a QR code) or a digital watermark pattern. The identifier may correspond to the window (e.g., West 34$^{th}$ St., window #3), or to a product displayed behind the window (e.g., Samsung Galaxy Pro 2 tablet). The user device 20 can include software that decodes the identifier from the machine-readable symbology, and sends it to a remote database computer 22. The database responds by sending associated information back to the user device 20 for display, e.g., specifications, price and buying options for the product 16. Suitable software includes the Digimarc Discover app, available from the Apple App Store and detailed, e.g., in patent publication 20150286873.

The electronic data projector 12 can be a conventional unit, such as an Epson VS230 or a ViewSonic PJD5132. Each includes keystone correction, to allow projection of a rectangle of the original aspect ratio, despite off-axis (oblique) projection. The projector is controlled by a computer 24, which determines the pattern to be projected, its coloration, and intensity.

The optical filter can comprise a film or other layer that is laminated, printed, or otherwise applied to a glass pane. Alternatively, the window can comprise an assembly in which the optical filter is an integral and component part (e.g., as in an LCD panel). The filter may be passive and static, or it may be selectively activated (e.g., as in an LCD panel).

Figure 2:
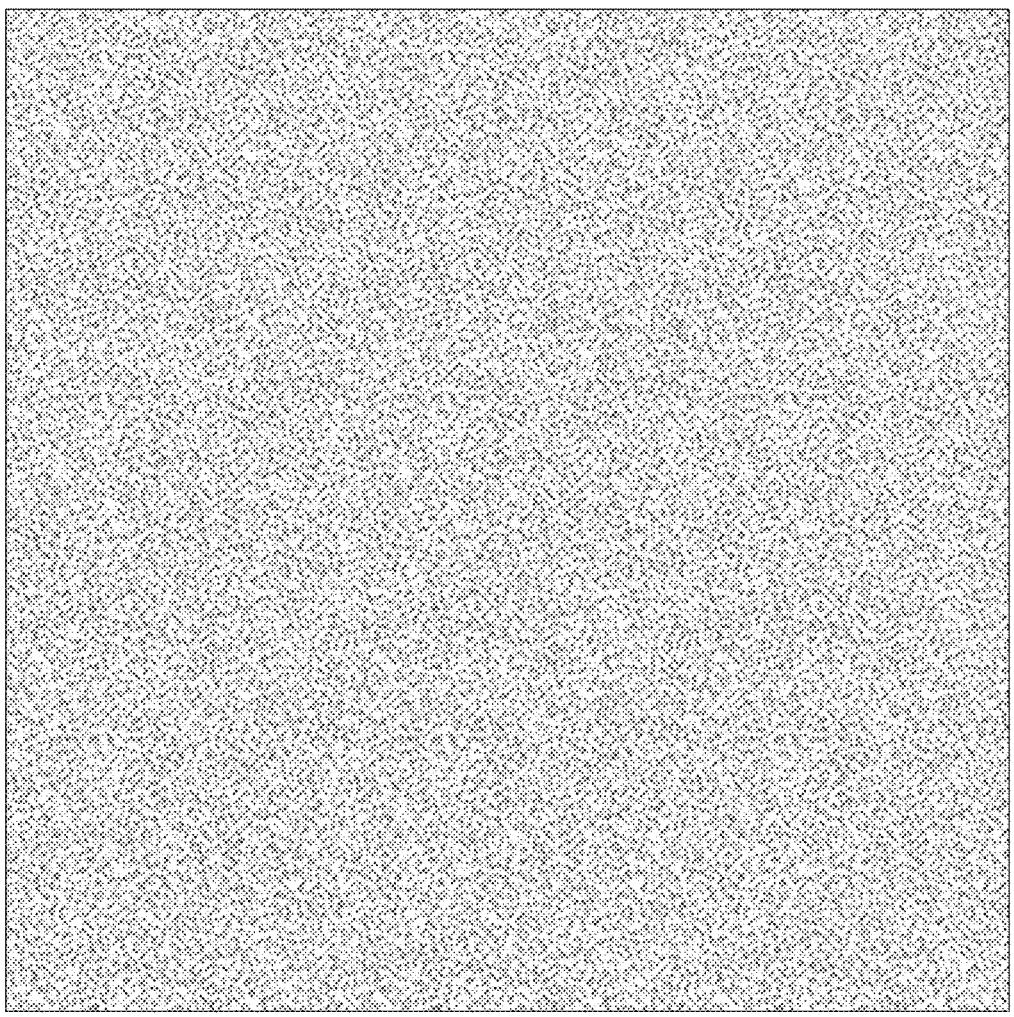
FIG. 2 illustrates a representative digital watermark tile.

FIG. 2 shows an identifier-encoding digital watermark pattern, of the sort that may be projected (in tiled fashion) onto the window.

Desirably, the display window 10 is substantially transparent (i.e., at least 75%) to the visible light spectrum. The notched band can comprise a small fraction of this spectrum, i.e., with the full width half-maximum (FWHM) points defining a filter width of less than 100 or 50 nm. In some embodiments, still narrower filter widths are employed, such as less than 20, 10 or 5 nm.

An example of an idealized window is one that is 100% transparent to light from 400 to 700 nm, except for a notch from 450 to 465 nm, which is fully blocked (i.e., reflected) and scattered in diffuse (Lambertian) fashion. The notch is this instance is 15 nm in width. 100% transmission across 285 nm of the visible light spectrum, together with 0% transmission across the remaining 15 nm of spectrum, yields a window that is said to be 95% transparent to visible light.

In actual practice, rejection in the notch band is less than perfect. (Nor is high rejection in the notch band required; reflection of only 50%, 25% or even 10% in the notched band can be adequate for the reflected light pattern to be distinguished.) In actuality, transmission of light outside the notch is also less than perfect. Many materials transmit on the order of 85% of the visible light outside the notch band, but less transmission may be desirable in some instances (e.g., tinted store windows). Lambertian reflectance (scattering) is also rare in actual practice. While some specular reflection is acceptable, it is desirable for at least 10% of the incident light to be reflected in non-specular fashion—at least in the image spectrum used for identifier decoding.

In the example earlier-given, the notch is in the blue region of the spectrum. Such a notch slightly distorts the color appearance of items viewed through the glass, but the tinting effect is usually far too subtle to be noticed by casual viewers under typical conditions. (In some embodiments, the tinting is too subtle to be noticed by human viewers even in laboratory conditions, with alternating comparisons between tinted and full-spectrum views of the same scene.)

Most consumer cameras include a monochrome image sensor, overlaid with a red/green/blue (RGB) color filter array (CFA) in a Bayer pattern. The CFA applies a red bandpass filter to some camera pixels, a green filter to others, and a blue filter to still others. In an illustrative CFA, the peak transmission of the red, green and blue filters occurs at 610, 530, and 460 nm, respectively. These are candidate wavelengths for the window glass notch filter. For example, the attenuation at one of these wavelengths may be at least 3 db greater than the attention at wavelengths both 50 nm above and below.

In an arrangement in which the window notch filter is at the 460 nm wavelength, the software that decodes the encoded identifier from the projected pattern can operate just on blue channel data provided by the camera's RGB imagery. Likewise for 620 nm/red channel data, and 530 nm/green channel data.

The illumination from the projector 12 may be colored, such that a majority of the projected light energy is within the notched band. Alternatively, the projector may emit a broader (in some instances full) spectrum of visible light, in which case the projected light may also serve to illuminate the product 16, through the window glass.

In another embodiment, there is no projector 12. Instead, the notch filter is, itself, patterned. For example, the presence, and absence, of the filtering material can define a pattern. When halogen light, sunlight, or any other broad-spectrum light illuminates the window, the filtering material causes light within the notch band to be reflected, so that the pattern can be sensed by a camera.

Figure 3:
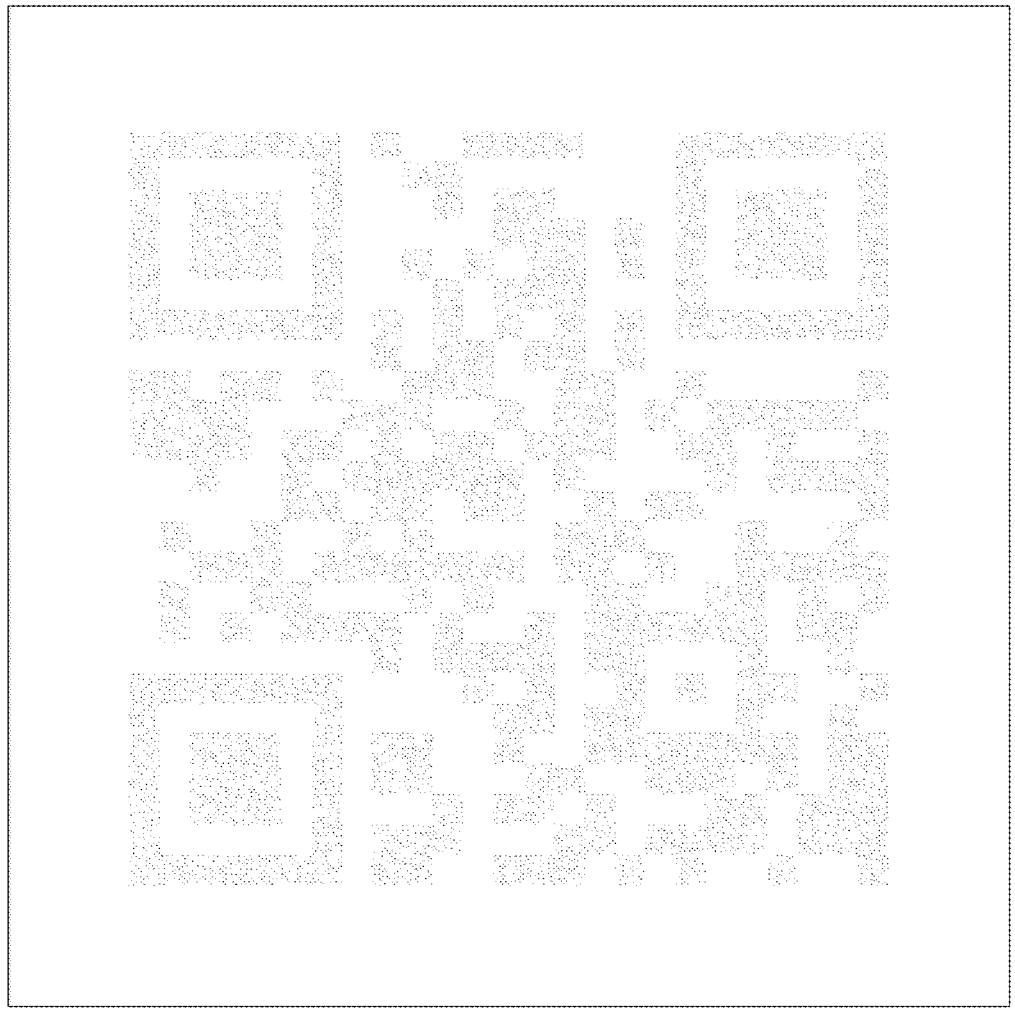
FIG. 3 illustrates a representative 2D barcode.

FIG. 3 shows an identifier-encoding QR code pattern of the sort that may be fashioned by application of a patterned spectral filtering film to a window. (The depiction in FIG. 3 is deliberately subtle, but in actual practice the pattern is still less visible in the finished window, due to the high degree of transparency across the visible spectrum.)

With both projected- and fixed-patterns, a component pattern can be replicated—in tiled fashion—to span an arbitrarily large area. The scale of the pattern can be selected to be decodable by the expected software from typical shopper-to-glass viewing distances.

Artisans are familiar with a variety of techniques for optical filtering. Some rely on interference structures. Others employ liquid crystals. Still others involve nanomaterials. An example of the latter is Wavista brand selective light film, which is available from Fujifilm of Santa Clara, Calif.

Figure 4:
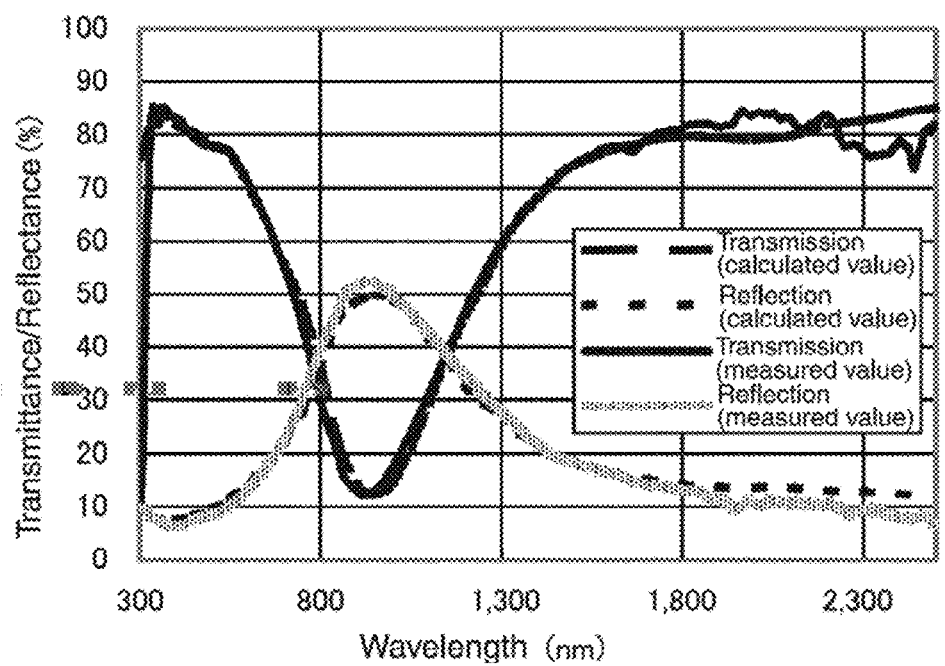
FIG. 4 shows the transmittance (and reflectance) of an illustrative material, as a function of wavelength.

The technology can also be practiced using window glass coatings that reflect infrared light for thermal management (sometimes termed heat barrier films). Many of these coatings exhibit greater reflection in the red part of the visible spectrum than at shorter wavelengths, e.g., as shown in FIG. 4. One particular coating employs silver nanoparticles that are shaped and positioned to effect a filtering effect through a localized plasmon resonance phenomenon, as described in Kiyoto et al, Development of a Near-Infrared Reflective Film Using Disk-Shaped Nanoparticles, Fujifilm Research and Development Report No. 58-2013 (attached to application 62/096,415), from which FIG. 4 is excerpted. Additional information on such materials is provided in Fujifilm's WIPO published patent publication WO13146447 (attached, with machine translation, to application 62/096, 415), and in published US patent application 20110111210.
Further Arrangements Applications 62/136,146, filed Mar. 15, 2015, and 62/263, 369, filed Dec. 4, 2014, detail technologies that can be used in the present invention. One concerns use of narrow band absorption dyes that can be added to extender inks to yield inks that are transparent except at specific wavelength bands. (Such materials are available, e.g., from Stardust Materials, LLC.) Such an absorbing ink can be printed to define a pattern on glass—or on film applied to glass, and used in the embodiments described herein. A suitable pattern is the "sparse" watermark pattern detailed in those patent applications, and further detailed in patent application Ser. No. 14/725,399, filed May 29, 2015. Another is a QR code. Both such patterns can be tiled across the film.

One particular arrangement involves plural carriers (e.g., inks or varnishes) in which different absorption dyes are included. A first pattern is printed to absorb light in a band centered around 460 nm. Second and third patterns are printed to absorb light at bands around 530 nm and 620 nm, respectively. A film printed with three such patterns can be laminated to a window and illuminated with white light, or daylight. A camera viewing the illuminated film will find the first pattern revealed in the blue channel (460 nm), where the pattern appears as black (i.e., all incident illumination at that wavelength is absorbed. Likewise, the second pattern will appear as black in the green channel (530 nm), and the third pattern will be evident as black in the red channel (620 nm).

In a particular arrangement, each of these absorption bands is less than 60 nanometers in width, and may be less than 30, 15 or 8 nanometers in width (width being measured where the attenuation is at least 3 database from maximum transmissivity).

The three different patterns can target different audiences, e.g., by distance or angle.

For example, the first printed pattern (e.g., at 460 nm) can comprise features (e.g., watermark element or QR code elemental blocks) that are formed on the film at a small scale—enabling the pattern to be decoded by pedestrian-conveyed cameras located between one and three feet from the film. The second pattern (e.g., at 530 nm) can comprise intermediately-scaled features—enabling decoding of that pattern's payload at distances between three and eight feet from the film. The third pattern (e.g., at 620 nm) can comprise large-scaled features, enabling decoding from eight to 25 feet away. The pedestrian's smartphone can examine the red, green and blue color channels separately (sequentially or simultaneously), and try to decode from each the payload. The decoder will succeed in reading the encoded data from the color channel in which pattern is captured at a decodable scale.

In a different embodiment, the different patterns are tailored for viewing at different angles. For example, a pattern printed with ink that absorbs at 460 nm can be formed in normal fashion, for viewing straight-on (e.g., by a first observer whose smartphone is directed perpendicularly to the plane of the glass, that is—normal to the glass). A pattern printed with ink that absorbs at 530 nm can be warped in anticipation of viewing from 30 degrees to the right of normal (i.e., pre-distorted so that when viewed by a second observer from such angle, the viewing distortion returns the printed pattern to a rectilinear presentation—like the first observer has). Similarly, a pattern printed with ink that absorbs at 620 nm can be warped in the opposite manner, in anticipation of viewing from 30 degrees to the left of normal.

Again, the software decoder can examine each of the camera's red/green/blue color channels to find which one decodes properly.

In some embodiments, all three printed patterns encode the same payload. In other embodiments, it may be desirable for different patterns to convey different payloads.

Naturally, the technology can be used with more or less than three audiences, by using more or fewer printed patterns.

(Related technology, for targeting different audience members at different distances—or viewing angles—is detailed in applicant's U.S. Pat. No. 8,412,577.)

Concluding Remarks

Having described and illustrated the principles of our inventive work with reference to illustrative examples, it will be recognized that the technology is not so limited.

For example, while the technology has been described as employing a notch filter, this is not required. Even if a glass window has a flat spectral response, e.g., transmitting 90% and reflecting 10% across all visible light wavelengths, the shopper's portable device can still extract the pattern payload from the reflected light. (As noted earlier, at least some of the reflected light should be scattered, since this permits sensing from a variety of viewpoints.)

One variant embodiment applies a generally clear coating, such as a varnish, to the window glass, in a pattern that encodes the identifier. The varnish is not apparent to casual human viewers, but has reflectivity characteristics that allow a decodable pattern to be discerned from camera-captured imagery.

Although most of the discussion has concerned scattered reflection of incident light to enable detection, it will be recognized that absorption of incident light enables detection as well. Likewise, while the detailed embodiment described the projected light being incident from the same side of the glass as the viewer (18), in other embodiments the projected light can be incident on the opposite side of the glass. In this case, transmission—rather than reflection—will come into play.

When the present specification refers to a pattern being "subliminal," or not apparent to casual human viewers, this means that a person who is 12 inches or more from the glass, who has not previously been alerted to the presence of a pattern on the glass, and who looks through the glass to one or more subjects on the other side, does not notice the pattern.

While the technology has been described as employing visible light, this is not required. The pattern may be manifested, and sensed, outside the visible range, such as at wavelengths shorter than 400 nm, or longer than 700 nm. (Smartphone cameras commonly can sense imagery at wavelengths somewhat beyond the 300 nm spectrum sensible by human vision.)

Some embodiments employ glass windows with two or more spectral notches, e.g., a 15 nm notch centered at 610 nm, and another centered at 460 nm. Or one notch in the visible spectrum, and one in the infrared spectrum. The projected pattern can have peaks at both wavelengths, or a computer driving the projector can switch between the different notches based on circumstances—such as ambient lighting conditions.

Most electronic data projectors include keystone correction. However, if such correction is missing, or inadequate, the software app on the shopper's device can detect and correct-for geometric distortion, if desired. For example, in the case of projected 1D or 2D barcodes, these indicia have strong vertical and horizontal edges. These edges can be used as a guide in warping the image to counteract distortion introduced by the projector location and the camera's viewpoint. So doing sometimes aids in decoding. (If a watermark signal is used, known spatial frequency impulse functions in the watermark signal can be used to reverse affine distortion, as detailed in the documents incorporated by reference.)

The exemplary data projectors employ a broad spectrum bulb (e.g., xenon) and an LCD light gate or digital micromirror devices. However, other types of projection systems can be employed. One alternative is a laser projector, in which a beam of laser light is quickly steered along a path on a projection surface (i.e., the window glass) and which, due to human persistence of vision, appears to create a 2D image. In one such embodiment, the light source is a 633 nm laser diode, projecting on a window that exhibits a reflective notch at 633 nm. Steering can be accomplished using known techniques, including a galvanometer mirror scanner (e.g., as described in U.S. Pat. No. 7,295,722) or an acousto-optic modulator (e.g., as described in U.S. Pat. No. 6,426,781).

In some instances, focal distance may be an issue. The shopper may intend to photograph an item that is five feet away, on the other side of the window glass, while the projected pattern may just be two feet away, on the glass itself. Focusing on the more distant item may cause the image's depiction of the projected pattern to be blurred.

This can be addressed by use of a pattern whose component elements (e.g., lines in a linear barcode, squares in a QR code, etc.) are of a large enough scale that some blurring does not prevent decoding.

Alternatively, the projected pattern can include one or more known features (e.g., the squares that commonly appear in three of the four corners of a QR code, as depicted in FIG. 3, and the spatial frequency impulse functions in digital watermark signals) that can serve as "image priors." Knowing the true configuration of these image components enables the app to estimate and apply a deblurring filter to the captured image data that restores these features to their known configurations, and with them the rest of the projected pattern.

(More information on image deblurring is found in applicant's patent publication 20120208592, and in references cited therein, including Richardson, "Bayesian-Based Iterative Method of Image Restoration," J. Opt. Soc. Am. 62, 55-59, 1972; Lucy, "An Iterative Technique for the Rectification of Observed Distributions," Astronomical Journal, Vol. 79, No. 6, June, 1974, and Microsoft and MIT published patent applications 2010123807, 2008240607, 2008025627, 2010074552, and 2009244300. See, also, publications by Joshi, including his 2008 U.C. San Diego PhD thesis, "Enhancing Photographs Using Content-Specific Image Priors," and patent publications 20090316995, 20090324126, 20110109755 and 20110304687.)

The signal-to-noise ratio of the pattern can be enhanced by strobing the pattern on and off, e.g., at 10-15 Hz, and applying a differencing operation. The shopper's camera can capture a sequence of image frames, e.g., in video mode. Some will include the pattern; some will lack it. An image that lacks the pattern can be subtracted from one that includes it. The result is a difference image frame in which the projected pattern dominates (all other image elements that are common between the two frames having been canceled by subtraction). The two image frames can be spatially registered prior to subtraction (e.g., through discernment of corresponding SIFT- or other distinctive feature points in the images, and warping one image until such points align), to enhance the cancellation effect.

In some such embodiments, the mobile device can phase lock to the projector—examining frames of the captured imagery looking for a strobed one bit signal encoded in the projected pattern.

Some embodiments adapt the strength, or wavelength, of the projected pattern based on sensed conditions. For example, a camera connected to computer 24 can monitor the reflection of ambient light from the window. If the ambient light level is low (as in the evening), the intensity of the projected pattern can be reduced, and vice versa. Similarly, if the ambient light is sunset illumination—dominated by longer wavelength red and orange light, the projected pattern may switch to a different wavelength, e.g., in the blue part of the spectrum.

Although the above specification described the watermark-triggered response as being specific to the window location, or to the product displayed in the window, in other embodiments the response can additionally, or alternatively, depend on context. Context can be of many sorts, including computing context (network connectivity, memory availability, processor type, CPU contention, etc.), user context (user profile, location, actions, preferences, nearby friends, social network(s) and situation, etc.), physical context (e.g., lighting, noise level, traffic, etc.), temporal context (time of day, day, month, season, etc.), history of the above, etc. Thus, for example, information about a product displayed in the window can be filtered, or tailored, based on information already provided to that shopper, based on information about that shopper's previous purchases, information about that shopper's age, etc.

The above specification also noted that augmented reality overlays can be provided to the shopper as a watermark-triggered response. In the case of clothing in a window display, the response (e.g., on the user's portable device) can comprise a view of the clothing on an avatar of the shopper.

While the projected pattern in the above embodiments is generally static, or seasonal (e.g., changing when merchandise displayed in a store window is changed), the pattern can change in response to user action.

In one particular embodiment, the identifier decoded from the initially-projected pattern triggers a response on the user's smartphone (e.g., as defined by information associated with the identifier in the database 22) inviting the user to start an on-glass session by tapping twice on the glass. Such taps can be sensed, e.g., by computer 24, in known ways, including optically, or by one or more microphones or other vibration sensors affixed to the glass—looking for two taps within 700 milliseconds of each other. When this user signal (or another) is detected, the projector can increase its intensity so that reflective scattering from the glass becomes visible to the user. The projector can then present information to the user, by text and graphics (monochrome, if a single-band notch filter is employed), about the product. Alternatively, the system can engage the user in an interactive activity, such as game playing, or web browsing. The user can tap on the window at different locations (which the computer can distinguish using time of arrival analysis on data from plural sensors), and the system can change the displayed presentation in accordance with such user input.

In some embodiments, the projected information serves as an augmented reality overlay atop the product displayed behind the window. Such arrangement requires knowledge of the shopper's viewpoint, so that augmentation can be projected at regions on the glass between the shopper's pupils and the displayed product. Computer 24 can employ a sidewalk-facing camera to estimate the shopper viewpoint, and adjust the projected augmentation accordingly.

Instead of tapping on the window to provide user input, the user may agree to a request from computer 24 to establish a wireless communication session with the user's device (e.g., by Bluetooth, etc.). After such pairing, user input can be entered via the touchscreen or other input system of the user device, with resultant output displayed on the window 10 by computer 24 and projector 12.

In one particular embodiment, two shoppers can engage in a game of ping pong, rendered across the display window of a department store (akin to the early video game Pong, but rendered large for public viewing). The projection system 24 renders a large ball (perhaps three feet in diameter) moving across the display window to a player's projected virtual paddle. The player raises their phone to raise the paddle, or lowers the phone to lower the paddle. If the paddle is correctly positioned to intersect the approaching ball, the ball rebounds towards the other player's position—ten or twenty feet away, across the glass. A player scores when their opponent fails to return the ball. The ball's speed can accelerate as play continues. After one player has earned five points, the game terminates, and the computer system invites other nearby shoppers to play (or perhaps allowing the winner to play again).

While some embodiments tile the same machine-readable pattern across a large window, in other embodiments, different patterns are applied to different parts of the window, to convey different encoded identifiers. By such arrangement, different regions of the window can be associated with different linked information (e.g., product information). For example, in an Apple Store display window that features an iPhone device at one position, and an iPad device at a second position a few feet away, shoppers who capture imagery of the iPhone device get linked (via database 22) to iPhone product information, whereas shoppers who capture imagery of the iPad device get linked to iPad product information.

One particular such arrangement projects an array of block patterns in a tiled arrangement, where each pattern conveys a different payload including a position identifier. The identifier can comprise row and column indices. Or it can comprise a single number, which is resolved by the database 22 to indicate its position on the window.

The term "window" as used in this disclosure includes any glass-like medium through which a customer can view. It needn't face outdoors, and needn't be vertical. For example, the top of a jeweler's display cabinet is regarded as a window.

Although the focus of this disclosure has been on transparent—primarily glass—media, the same principles are applicable with other materials, which needn't be glass, nor transparent. In supermarkets, for example, many items are packaged in foil or plastic bags/pouches. Such materials tend to be optically specular, which makes it difficult to reliably read watermark or barcode indicia formed on such items. In accordance with a further aspect of the present technology, such packaging employs a patterned film layer using one of the technologies detailed herein, to make evident a pattern in a particular spectral band that can be sensed by an imaging system (e.g., a smartphone, or the store's checkout scanner). Particular examples include a foil pouch of tuna, a plastic bag of potato chips, and a plastic-wrapped case of chicken broth, each of which incorporates a patterned film layer that scatters or absorbs light at a wavelengths between 610 and 640 nm, to encode machine readable data.

While the detailed embodiment employs app software on the shopper's mobile device to perform certain of the detailed functionality (e.g., decoding an identifier from the projected pattern, and querying a database for associated information), in other embodiments such component functions can naturally be performed otherwise—including by operating system software on a shopper's device, by a remote server, by another smartphone or computer device, distributed between such devices, etc.

Similarly, while the detailed embodiment described computers 22 and 24 as separate, naturally their functions can be integrated in a single computer.

In the detailed embodiment, imagery may be captured and processed in response to an action by the shopper—such as pressing a physical or on-screen button. Desirably, however, the shopper's device is context-aware, and captures imagery and initiates the detailed functionality whenever circumstances seem to merit. For example, accelerometers and/or other sensors in a phone can detect that the phone has been moved within the past 700 milliseconds, and is being held approximately stationary, with one of its edges substantially horizontal. Further contextual clues can include the spectrum of the captured imagery (e.g., looking for a peak in the frequency band from which light is expected to be reflected from the window), and temporal strobing artifacts (e.g., due to refreshing of the projected image pattern). In response to such factors, camera imagery can be examined for the presence of a decodable pattern. If found, an identifier can be decoded and sent to the remote database for resolution, etc.

To keep this specification concise, as required by the Patent Act, applicant has omitted certain mundane details that are straightforward to artisans implementing such technology. For example, decoding barcode indicia, transmitting identifier data to a database, displaying metadata returned from a database, etc., are all familiar to artisans in the relevant fields.

As should be evident, the technology detailed herein finds utility with all manner of user devices. Not just smartphones, but also tablets, digital cameras, wrist- and head-mounted systems and other wearable devices, etc., can all make use of the principles detailed herein.

Particularly contemplated mobile devices include the Google Glass product; the Apple iPhone 6; smartphones following Google's Android specification (e.g., the Galaxy S4 phone, manufactured by Samsung, and the Google Moto X phone, made by Motorola), and Windows 8 mobile phones (e.g., the Nokia Lumia 1020).

The design of smartphones is familiar to the artisan. In general terms, each includes one or more processors, one or more memories (e.g. RAM), storage (e.g., a disk or flash memory), a user interface (which may include, e.g., a keypad, a TFT LCD or OLED display screen, touch or other gesture sensors, a camera or other optical sensor, a compass sensor, a 3D magnetometer, a 3-axis accelerometer, a 3-axis gyroscope, one or more microphones, etc., together with software instructions for providing a graphical user interface), interconnections between these elements (e.g., buses), and an interface for communicating with other devices (which may be wireless, such as GSM, 3G, 4G, CDMA, WiFi, WiMax, Zigbee, Thread or Bluetooth, and/or wired, such as through an Ethernet local area network, etc.).

The processes and system components detailed in this specification can be implemented as instructions for computing devices, including general purpose processor instructions for a variety of programmable processors, such as microprocessors (e.g., the Intel Atom, the ARM A5, the Qualcomm Snapdragon, and the nVidia Tegra 4; the latter includes a CPU, a GPU, and nVidia's Chimera computational photography architecture), graphics processing units (GPUs, such as the nVidia Tegra APX 2600, and the Adreno 330—part of the Qualcomm Snapdragon processor), and digital signal processors (e.g., the Texas Instruments TMS320 and OMAP series devices), etc. These instructions can be implemented as software, firmware, etc. These instructions can also be implemented in various forms of processor circuitry, including programmable logic devices, and field programmable gate arrays (e.g., the Xilinx Virtex series devices). Execution of the instructions can be distributed among processors and/or made parallel across processors within a device or across a network of devices. Processing of data can also be distributed among different processor and memory devices. Cloud computing resources can be used as well. References to "processors," "modules" or "components" should be understood to refer to functionality, rather than requiring a particular form of implementation.

Software instructions for implementing the detailed functionality can be authored by artisans without undue experimentation from the descriptions provided herein, e.g., written in C, C++, Visual Basic, Java, Python, Tcl, Perl, Scheme, Ruby, etc., in conjunction with associated data. Smartphones and other devices according to certain implementations of the present technology can include software modules for performing the different functions and acts.

Known browser software, communications software, imaging software, and media processing software can be adapted for use in implementing the present technology.

Software and hardware configuration data/instructions are commonly stored as instructions in one or more data structures conveyed by non-transitory tangible media, such as magnetic or optical discs, memory cards, ROM, etc., which may be accessed across a network. Some embodiments may be implemented as embedded systems—special purpose computer systems in which operating system software and application software are indistinguishable to the user (e.g., as is commonly the case in basic cell phones). The functionality detailed in this specification can be implemented in operating system software, application software and/or as embedded system software.

Another form of implementation is electronic circuitry that has been custom-designed and manufactured to perform some or all of the component acts, as an application specific integrated circuit (ASIC).

To realize such an implementation, the relevant module(s) (e.g., watermark decoding) are first implemented using a general purpose computer, using software such as Matlab (from Mathworks, Inc.). A tool such as HDLCoder (also available from MathWorks) is next employed to convert the MatLab model to VHDL (an IEEE standard, and doubtless the most common hardware design language). The VHDL output is then applied to a hardware synthesis program, such as Design Compiler by Synopsis, HDL Designer by Mentor Graphics, or Encounter RTL Compiler by Cadence Design Systems. The hardware synthesis program provides output data specifying a particular array of electronic logic gates that will realize the technology in hardware form, as a special-purpose machine dedicated to such purpose. This output data is then provided to a semiconductor fabrication contractor, which uses it to produce the customized silicon part. (Suitable contractors include TSMC, Global Foundries, and ON Semiconductors.)

Essentially all of the functions detailed above can be implemented in such fashion, e.g., decoding a watermark payload from captured imagery, querying databases, etc. However, because the resulting circuit is typically not changeable, such implementation is best used for component functions that are unlikely to be revised. (Contrarily, application Ser. No. 14/842,575, filed Sep. 1, 2015, details hardware watermark detectors that are reconfigurable.)

As indicated above, reference to a "module" that performs a certain function should be understood to encompass one or more items of software, and/or one or more hardware circuits—such as an ASIC as just-described.

As indicated, different configurations of the functionality can be implemented on different devices. For example, in a system in which a smartphone communicates with a computer at a remote location, different tasks can be performed exclusively by one device or the other, or execution can be distributed between the devices. Extraction of watermark information from imagery is an example of a process that can be distributed in such fashion. Thus, it should be understood that description of an operation as being performed by a particular device (e.g., a smartphone) is not limiting but exemplary; performance of the operation by another device (e.g., a remote server), or shared between devices, is also expressly contemplated.

In like fashion, description of data being stored on a particular device is also exemplary; data can be stored anywhere: local device, remote device, in the cloud, distributed, etc.

The techniques of digital watermarking are presumed to be familiar to the artisan. Examples are detailed, e.g., in the applicant's patent documents U.S. Pat. Nos. 6,614,914, 6,590,996, 6,122,403, 20100150434 and 20110274310. Such watermarks are commonly imperceptible, meaning they are not noticeable to a viewer examining a watermarked object from a typical viewing distance, e.g., 20 inches. Image watermarks commonly encode between 40 and 100 bits of information in a 2D block pattern, and plural such blocks are typically tiled across a surface for redundancy. If more than 40-100 bits of information are desired (as is often the case), the watermark typically conveys an identifier that identifies a record in a remote database. The identifier is sent to the database, which returns expanded information.

While an image watermark typically conveys a short and static payload, this need not be the case. For example, the projector can present 30 frames per second, with each successive frame (or each second or third frame, etc.,) encoding a different payload. By such arrangements, a smartphone detector can extract hundreds, or a thousand or more bits of data from a short clip of video captured from the window glass, spanning less than a second. Such a large payload capacity can obviate the need to query a remote database for additional information, and avoid the associated time delay. (Such a payload can convey, e.g., any of the information that might otherwise be fetched from a remote database, such as a web page URL in ASCII form, etc.) The same time-based encoding technique can likewise be used with other machine readable symbologies, such as barcodes.

Applicant's Discover app, and related technology are detailed, e.g., in published patent applications 20110212717, 20110161076, 20120208592, 20130311329, and 20140052555, and in pending application Ser. No. 14/251,229, filed Apr. 11, 2014 (now published as 20150016712). Applicant's other work that is relevant to the present technology includes that detailed in patent documents 20120214515 and 20140164124.

This specification has addressed several different embodiments. It should be understood that the methods, elements and concepts detailed in connection with one embodiment can be combined with the methods, elements and concepts detailed in connection with other embodiments. Applicant similarly recognizes and intends that the methods, elements and concepts of this specification can be combined, substituted and interchanged—not just among and between themselves, but also with those known from the cited prior art. Moreover, it will be recognized that the detailed technology can be included with other technologies—current and upcoming—to advantageous effect. Implementation of such combinations is straightforward to the artisan from the teachings provided in this disclosure.

While this disclosure has detailed particular ordering of acts and particular combinations of elements, it will be recognized that other contemplated methods may re-order acts (possibly omitting some and adding others), and other contemplated combinations may omit some elements and add others, etc.

Although disclosed as complete systems, sub-combinations of the detailed arrangements are also separately contemplated (e.g., omitting various features of a complete system).

While certain aspects of the technology have been described by reference to illustrative methods, it will be recognized that apparatuses configured to perform the acts of such methods are also contemplated as part of applicant's inventive work. Likewise, other aspects have been described by reference to illustrative apparatus, and the methodology performed by such apparatus is likewise within the scope of the present technology. Still further, tangible computer readable media containing instructions for configuring a processor or other programmable system to perform such methods is also expressly contemplated.

The present specification should be read in the context of the cited references. Those references disclose technologies and teachings that the applicant intends be incorporated into embodiments of the present technology, and into which the technologies and teachings detailed herein be incorporated.

To provide a comprehensive disclosure, while complying with the statutory requirement of conciseness, applicant incorporates-by-reference each of the documents referenced herein. (Such materials are incorporated in their entireties, even if cited above in connection with specific of their teachings.) These references disclose technologies and teachings that can be incorporated into the arrangements detailed herein, and into which the technologies and teachings detailed herein can be incorporated. The reader is presumed to be familiar with such prior work.

The claims submitted with this application address just a small fraction of the patentable inventions disclosed herein. Applicant expects many more, and broader, claims will be issued from this patent family.

In view of the wide variety of embodiments to which the principles and features discussed above can be applied, it should be apparent that the detailed embodiments are illustrative only, and should not be taken as limiting the scope of the invention. Rather, applicant claims as the invention all such modifications as may come within the scope and spirit of the following claims and equivalents thereof.

The invention claimed is:

1. Apparatus comprising:
a display window at a retail store; and
means for forming a subliminal pattern on said glass, the pattern encoding an identifier in a machine-readable symbology;
wherein a camera-equipped user device on one side of the window can capture imagery depicting an item of merchandise on the opposite side of the window, which imagery also includes said machine-readable symbology, but said symbology is not evident to the user.

2. The apparatus of claim 1 in which said optical pattern is detectable as illumination reflected and scattered from said display window.

3. The apparatus of claim 1 in which the window includes an optical filter that notches a band of visible spectrum, wherein said optical pattern is detectable as illumination reflected and scattered from said optical filter, in said band.

4. The apparatus of claim 3 in which at least ten percent of the incident illumination in said band is reflected from the window, in non-specular fashion.

5. The apparatus of claim 1 in which said means comprises an optical data projector that obliquely projects said pattern onto said glass.

6. The apparatus of claim 5 in which a majority of the visible light energy projected by said projector is within said band.

7. The apparatus of claim 1 in which said means comprises a layer of patterned varnish applied to the glass.

8. The apparatus of claim 1 that further includes a product displayed on one side of the glass, for imaging by a user's camera-equipped device from the opposite side of the glass, the apparatus also including a physical computer memory device that associates said identifier with information about said product, for presentation by the user's device.

9. A method of associating machine readable data with an item of merchandise presented at a retail store, the method comprising the acts:
providing a medium through which a person can view the item of merchandise, said medium having a notch in a spectral transmissivity function that notches a band of wavelengths, including a first wavelength; and
projecting light including said first wavelength onto the medium, the projected light producing a pattern on the medium that encodes an identifier in a machine-readable symbology;
wherein a camera-equipped device conveyed by the person can capture imagery of the item of merchandise through the medium, which imagery also includes said machine-readable symbology, but said symbology is not evident to the user.

10. The method of claim 9 in which the medium transmits less than 75% of illumination at said first wavelength.

11. The method of claim 10 in which said medium transmits more than 85% of illumination at wavelengths outside said band of wavelengths.

12. The method of claim 9 in which the medium transmits less than 50% of illumination at said first wavelength.

13. The method of claim 12 in which said medium transmits more than 85% of illumination at wavelengths outside said band of wavelengths.

14. The method of claim 9 in which said notched band of wavelengths, by reference to full width half-maximum points, is less than 50 nanometers in width.

15. The method of claim 9 in which said notched band of wavelengths, by reference to full width half-maximum points, is less than 20 nanometers in width.

16. The method of claim 9 in which said notched band of wavelengths, by reference to full width half-maximum points, is less than 10 nanometers in width.

17. The method of claim 9 in which said first wavelength is a visible light wavelength.

18. The method of claim 9 in which said light is projected with said pattern.

19. The method of claim 9 in which said pattern is defined by patterning of a film or varnish that forms part of said medium.

20. The method of claim 9 in which said pattern is defined by a heat barrier film that forms part of said medium.

* * * * *